United States Patent [19]

Lunden

[11] 4,330,055
[45] May 18, 1982

[54] BOARD FEEDER FOR LUMBER HANDLING SYSTEMS

[76] Inventor: Sidney L. Lunden, E. 12205 Empire Way, Spokane, Wash. 99206

[21] Appl. No.: 139,417

[22] Filed: Apr. 11, 1980

[51] Int. Cl.³ .................... B65G 37/00; B65G 25/00
[52] U.S. Cl. .................................. 198/474; 198/486; 198/488; 144/245 R
[58] Field of Search ............... 198/491, 486, 488, 474; 144/245 R, 24 LH

[56] References Cited

U.S. PATENT DOCUMENTS

| | | | |
|---|---|---|---|
| 3,080,042 | 3/1963 | Sherman | 198/491 |
| 3,147,842 | 9/1964 | Rambo | 198/491 |
| 3,367,478 | 2/1968 | Brookhyser | 198/486 |
| 3,388,815 | 6/1968 | Lingl | 198/486 |
| 3,605,981 | 9/1971 | Danieli | 198/774 |

*Primary Examiner*—Robert B. Reeves
*Assistant Examiner*—Brian Bond
*Attorney, Agent, or Firm*—Wells, St. John & Roberts

[57] ABSTRACT

A board feeder is described for loading boards one at a time from a feed station to a delivery station. The individual boards are gripped on opposite horizontal surfaces, lifted over a stop, and deposited at the delivery station. Clamp members are situated on opposite horizontal board sides for moving together to grip the board and for movement between the feed station and the delivery station. A top clamp member moves in an arc back and forth over the stations and stop. A bottom clamp member moves in a closed curve matching the stroke of the top clamp arc. A top part of the closed path represents a delivery stroke starting at the feed station and passing over the stop. The top part of the path ends at the delivery station. The remainder of the top clamp path is a return stroke situated below the stop and stations.

6 Claims, 8 Drawing Figures

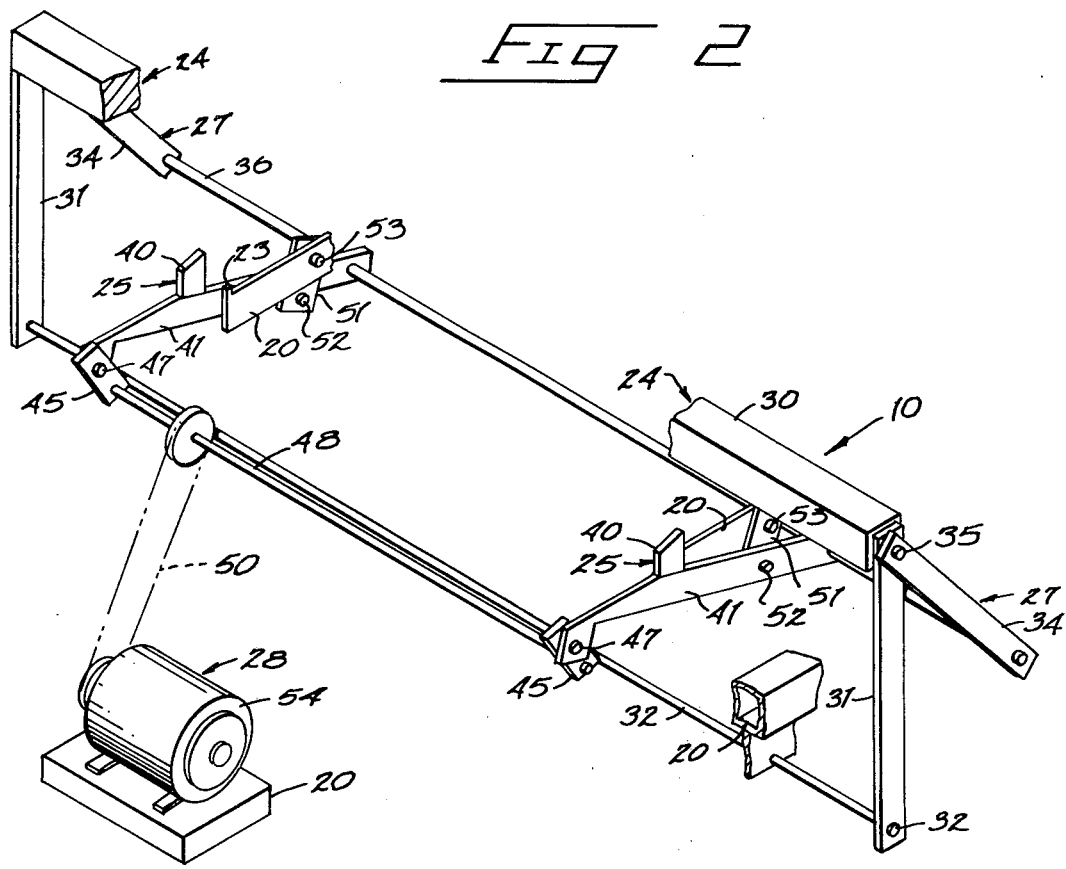
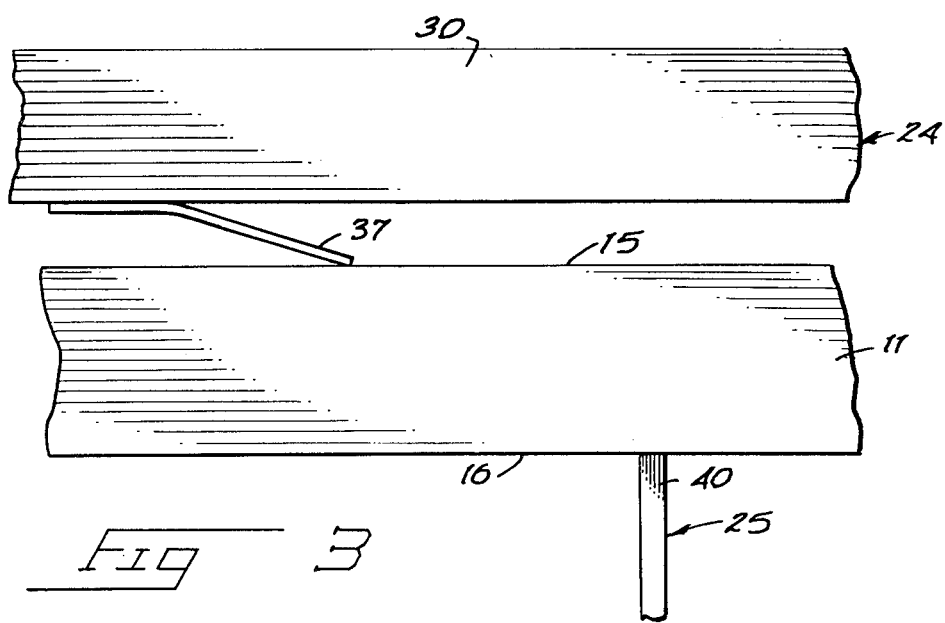

BOARD FEEDER FOR LUMBER HANDLING SYSTEMS

BACKGROUND OF THE INVENTION

The present invention relates to lumber handling apparatus in which boards are moved successively from a single feed station to a plurality spaced delivery station.

Handling of boards, especially small elongated boards or "stickers" that are used for spacing layers of lumber apart in a stack, is a difficult task. This is especially true where the "stickers" are warped or twisted. Some positive gripping action must be provided if the stickers are to be moved automatically from one location to another, as when successive stickers are to be moved from a feed conveyor in an orderly manner onto a delivery conveyor.

U.S. Pat. No. 3,904,044 discloses a lumber stacking apparatus that makes use of a sticker placing mechanism where successive stickers are delivered from a feed conveyor to a delivery conveyor. The stickers are lifted or moved by engagement of single side surfaces. The sticker handling device operates well on straight stickers, but is not effective with twisted or warped stickers.

The present invention operates well even with warped, twisted stickers by gripping the successive stickers along opposed side surfaces as they move to shift the successive stickers from a feed station over a stationary stop to a delivery station. The stickers are gripped while on the feed conveyor and the grip isn't released until the sticker has been moved to the delivery conveyor.

BRIEF DESCRIPTION OF THE DRAWINGS

FIG. 2 is a pictorial view of the linkage mechanism and associated members of the present invention;

FIG. 3 is an enlarged detail view of a sticker gripped between two clamp members of the present invention;

DETAILED DESCRIPTION OF A PREFERRED EMBODIMENT

Figure 1:
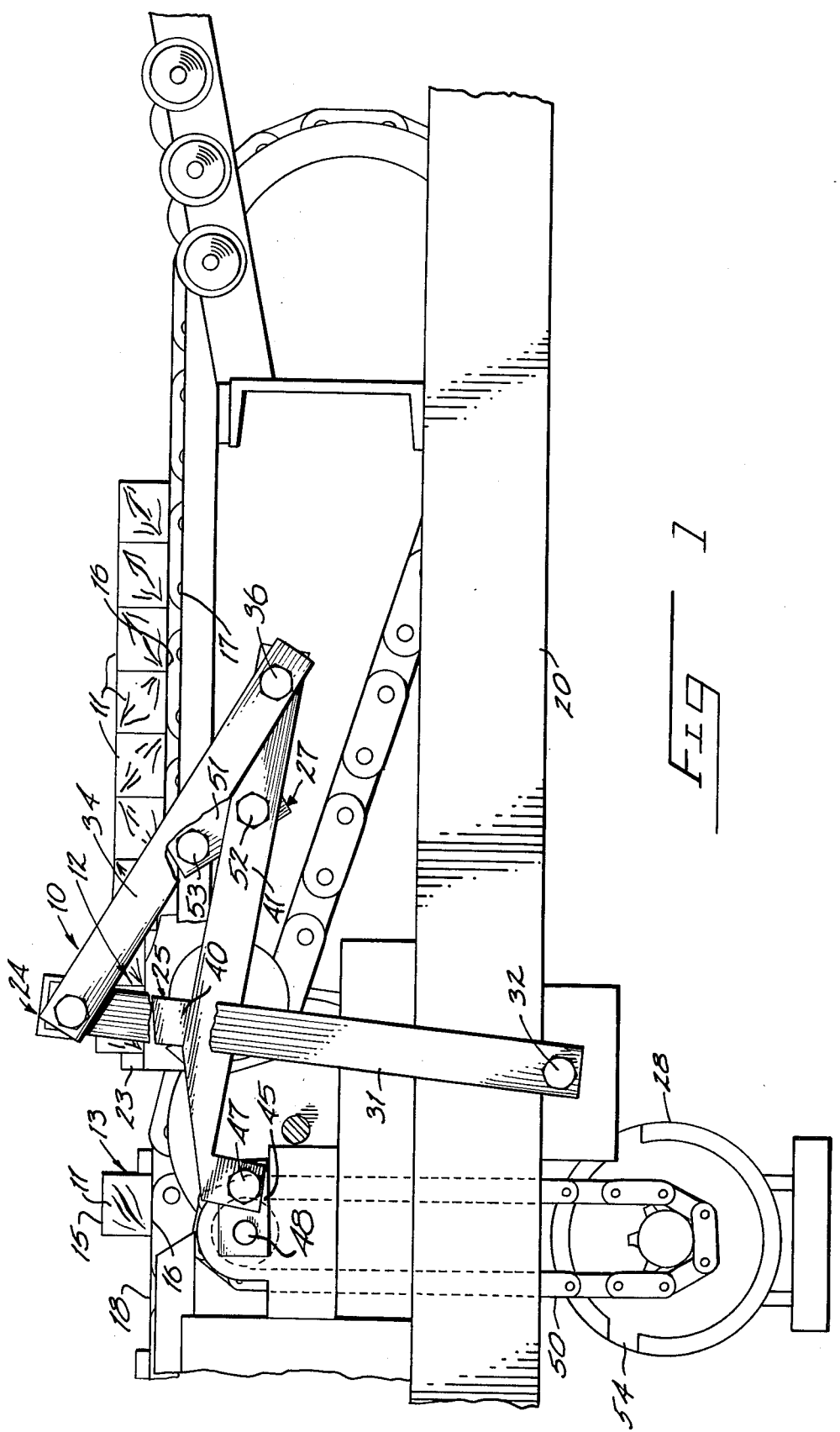
FIG. 1 is a fragmented diagrammatic side view illustrating the present mechanism.
Figure 4:
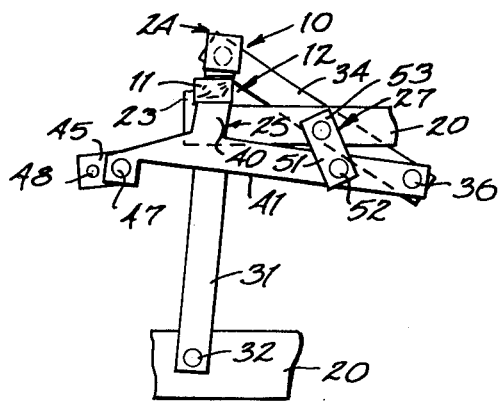
FIGS. 4 through 7 are schemmatic representations of the operational sequence involved with the present invention.

A feeder embodying a preferred form of the present invention is indicated in the accompanying drawings by the reference numeral 10. The present feeder 10 is to be used in lumber handling systems for feeding a board 11 from a feed station 12 to a delivery station 13.

For purposes of this application, the term "board" is to be taken broadly as meaning any elongated wood member having opposed elongated parallel side surfaces. The "boards" 11 shown in the drawings (FIGS. 1 and 3) include elongated top side surfaces 15 and parallel elongated bottom side surfaces 16.

A "sticker" is a small board that is used primarily in the lumber industry. Thus the term "sticker" will be used in this application interchangeably with "board" and referred to with the same reference number.

The present feeder 10 has broad application to many areas of the lumber handling industry but finds particularly beneficial use in conjunction with lumber stacking machines for the purpose of delivering "stickers" from a hopper and feed conveyor 17 (FIG. 1) at the feed station 12 to a delivery conveyor 18 at the delivery station 13. Only a portion of the hopper and feed conveyor assembly 17 is shown, along with a portion of a delivery conveyor 18. Such mechanisms are shown in substantially more detail by U.S. Pat. No. 3,904,044, related portions of which are hereby incorporated by reference into the present application.

The present feeder 10 may include a supportive framework 20 that may be separate from or integral with the adjacent framework of the remaining lumber handling system. The framework 20 defines the feed station 12 preferably along a horizontal plane, with the delivery station 13 (delivery conveyor 18) situated along a horizontal plane spaced from the feed station by a stationary stop 23. The stop 23 may be provided as a simple upright dog fixed to the framework 20. It is preferable also that the two stations be situated at the same or similar elevations.

The stickers 11 are delivered in a direction transverse to their lengths across the feed conveyor 17 to the stop 23. The feed conveyor 17 may be operated constantly to continuously urge the successive stickers forwardly against the stop. A single sticker will therefore always be present at the feed station so long as there remains any stickers on the feed conveyor 17.

The present feeder 10 includes a first clamp means 24 and a second clamp means 25 that are operated in coordination with each other to: (1) grip successive stickers at the feed station; (2) move them over the stop to the delivery station; and subsequently (3) release the stickers at the delivery station. The first clamp means engages the top side surfaces 15 and reciprocates in an arcuate path 57 (FIG. 8) between the delivery and feed stations. The second clamp means 25 engages the bottom side surfaces 16 of the boards and moves in a closed arcuate path 58 from one station to the other. A linkage means 27 is provided to move the clamps in unison between the stations while a drive means 28 (FIG. 1) operates the linkage means to cause movement of the two clamp means.

The first clamp means 24 is shown in substantial detail by FIGS. 2 and 3. The first clamp means includes an elongated cross bar 30 that is positioned above the hopper feed conveyor 17 and delivery conveyor 18. It extends longitudinally with respect to the stickers on the conveyors and projects beyond opposite ends thereof. The cross bar 30 is mounted to a pair of rocker arms 31 that extend between opposed ends of the cross bar and the framework 20.

A pivot shaft 32 extends between rocker arms 31 and framework 20 to define a fixed horizontal pivot axis for the first clamp means 24 that is preferably parallel to the stickers on the feed conveyor 17. The pivot axis defined by shaft 32 is preferably situated directly below the stop 23 so the arcuate path 57 defined by the cross bar 30 will assume the configuration shown in FIG. 8. Specifically, the opposite ends of the reciprocating path are situated closely adjacent to the top surfaces of the stickers at the two stations. The path 57 extends above the stop 23 between the two stations 12, 13.

Connecting links 34 are provided to join the first clamp means 24 to the second clamp means 25. The links 34 are mounted by pins 35 to upper ends of the rocker arms 31. Opposite ends of the connecting links 34 are connected to a shaft 36 that mounts the links to the second clamp means 25. The pins 35 and shaft 36 define horizontal pivot axes that are parallel to the axis of shaft 32. Links 34 are included as part of the linkage means 27 in that they transmit motion from the second clamp means 25, directly to the first clamp means 24. In addition, the links 34 serve to control the angular orientation of the arcuate reciprocating path of the first clamp means with respect to the function of the first clamp means. The links 34 also guarantee simultaneous motion of the two clamp means 24, 25.

A spring means 37 (FIG. 3) is provided on the cross bar 30 for yieldably engaging the top surfaces 15 of successive stickers. The spring means 37, it may be noted, can be provided on either or both of the clamp means 24 or 25 for use generally in biasing an engaged sticker against the opposite clamp means. The spring means 37 is preferably a form of "leaf" spring having a free end for resiliently engaging the top surface of the sticker to firmly grip the sticker.

The second clamp means 25 is provided for the purpose of: (1) engaging the bottom surfaces 16 of the individual sticker; (2) lifting the sticker against the first clamp means; (3) together with clamp means 24, moving the stickers over the stop 23, and (4) releasing the sticker onto the delivery conveyor.

Figure 8:
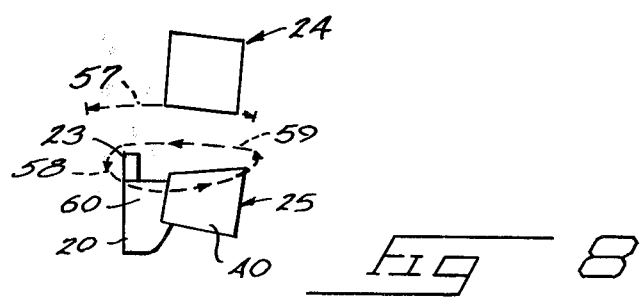
FIG. 8 is a diagrammatic representation of the paths followed by the sticker gripping members of the present invention.

The second clamp means 25 includes a pair of clamp supports 40 provided as integral parts of substantially horizontal clamp arms 41. The clamp supports 40 and clamp arms 41 are mounted to the frame by the linkage means 27 to move in a closed arcuate path 58 as shown by FIG. 8. The clamp supports 40 move upwardly at the feed station to engage the bottom surface of a sticker that is positioned against the stop 23. The supports 40 then continue on upwardly, lifting the sticker into engagement with the spring means 37 on the cross bar 30. The sticker is therefore positively gripped while being moved from the feed station to the delivery station.

The linkage means 27 has already been described to a limited extent. It includes the connecting links 34 and rocker arms 31. In addition, the linkage means includes a pair of crank arms 45 that are pivotally joined to forward ends of the clamp arms 41 by pivot pins 47. The crank arms 45, in turn, are rotatably mounted on a crank shaft 48 below the feed and delivery station. The shaft 48 is rotated by the drive means 28 to rotate the crank arms 360° about the crank shaft axis. The crank shaft axis, as well as the axis of the pins 47 are parallel to the rocker arm pivot axis.

Rearward ends of the clamp arms 41 are connected to the frame 20 by rocker links 51. The links 51 are attached by pivot pins 52 to the clamp arms 41. Opposite ends of the rocker links 51 are connected at pivots 53 to the framework defining a fixed horizontal axis. The distance between the pivots 53 and pins 52 represents a radius about which the rearward end of the clamp arms 41 are free to travel about the fixed horizontal axis of pivots 53.

Rotation of the crank arms 45 about the shaft axis will cause rocking motion of the links 51. The combined motion (the rocking motion of the rearward end of clamp arms 41 about the fixed horizontal axis along with the circular motion of the forward clamp arm ends) produce the substantially eliptical path 58 made by the clamp supports 40 (FIG. 8). Such path 58 is so arranged that approximately one half of the path (of the clamp brackets) is situated above the working surfaces of the feed and delivery conveyors. The bottom half of the arcuate path is situated below the conveyors and in a direction returning to the feed station.

Drive means 28 includes a chain linkage 50 connecting the crank shaft 48 to a drive mechanism 54. This mechanism may be operated independently or dependently upon drive mechanisms for the associated machinery. It may also be operated intermittently by appropriate controls to facilitate spacing of successive stickers along the delivery conveyor 18. Such spacing control can be manually or automatically controlled. Two alternate methods showing sticker spacing may be found in the above referenced patent.

Prior to operation, a load of stickers is delivered to the feed station 12. The feed conveyor 17 may operate continuously, sliding under the stickers when they come into engagement and halt the stickers against the stop 23. Therefore, when one stickers is lifted from engagement with the stop, the remaining stickers will index forwardly with the succeeding sticker moving into engagement with the stop.

A sticker at the feed station is situated elevationally between the two clamp means 24 and 25. Upon actuation of the drive means, the clamp means 24, 25 will be moved together simultaneously clamping the sticker and lifting it up and over the stop 23. The sticker 11 is then lowered onto the delivery conveyor where it is released. The two clamp means 24, 25 then separate from one another and move back to their original position at the feed station.

The first and second clamp means move simultaneously, with the top or first clamp means 24 moving in the reciprocating, arcuate path 57 in FIG. 8. The bottom or second clamp means 25 moves through the closed curve 58. An upper portion 59 of the curve 58 is at an elevation higher than the surfaces of the conveyors 17 and 18. Furthermore, the peak elevation is higher than the stop 23 so the sticker can be lifted upwardly off the feed conveyor, over the stop, and deposited onto the delivery conveyor.

Figure 5:
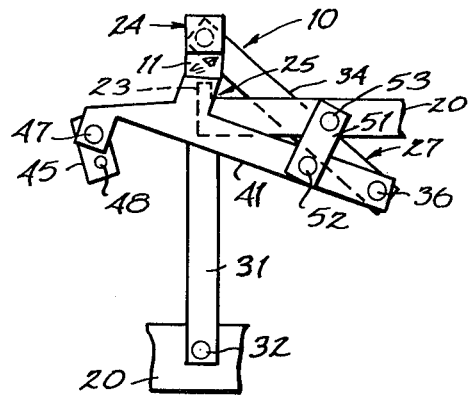
Figure 6:
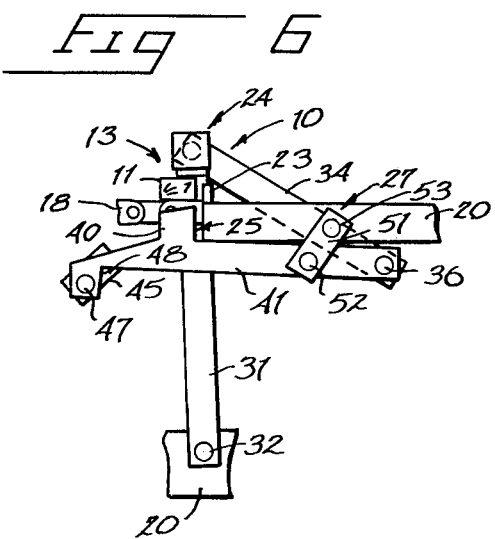
Figure 7:
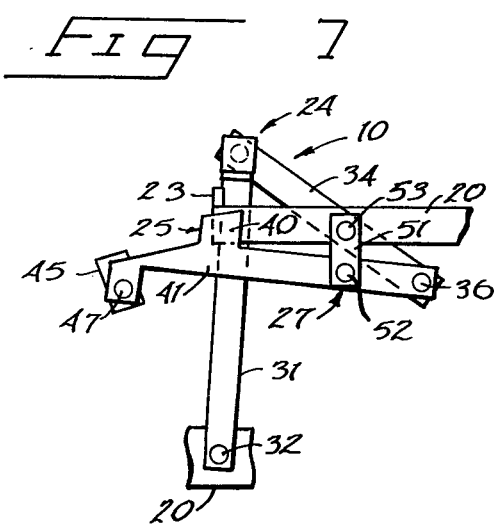

The upper curved portion 59 is complementary to the arc 57. The curved portion 59 is more sharply arcuate at its ends than the arcuate path 57 of the first clamp means. The second clamp means 25 will move sharply upward at the beginning of its forward stroke, lifting the sticker into engagement with the first clamp means before it moves over the stop (FIG. 5). Similarly, the second clamp means will descend sharply at the end of its forward stroke to release the gripping force against the sticker and lower the sticker onto the delivery conveyor (FIG. 6). A lower curved portion 60 of curve 58 is provided in the return path of the clamp means 25 and is below the stations to clear the stickers and frame as it returns.

The positive gripping of successive stickers between the two clamp means assures that even badly warped or twisted stickers can be moved from one station to the other. Other variations such as minor size differential among stickers is accommodated by the above described device.

The above description and attached drawings are given by way of example to set forth a preferred form of the present invention. Additional forms may fall within the scope of the following claims, which more precisely define my invention.

What is claimed is:

1. A board feeder assembly for lumber handling systems for successively feeding elongated boards having opposed top and bottom side surfaces from a feed station over a stop to a delivery station; comprising:
  a framework;
  a first clamp means on the framework for gripping the top surface of a board at the feed station and for releasing the board at the delivery station;
  second clamp means on the framework for gripping the bottom surface of a board at the feed station and for releasing the board at the delivery station;
  linkage means interconnecting the first and second clamp means for reciprocating the first and second clamp means in unison between the feed station and delivery station;
  drive means connecting the frame and linkage means for selectively operating the linkage means to reciprocate the first and second clamp means between the feed and delivery stations; and
  wherein the second means is moved through a closed curve with an upper portion of the curve situated above the feed station and delivery station and a lower portion of the curve situated below the feed station and delivery station.

2. The feeder as set out by claim 1 for feeding boards in a direction transverse to their lengths wherein the first clamp means is pivoted about an axis parallel to the board lengths, said axis being located below the feed station.

3. The feeder as set out by claim 2 wherein the axis is fixed relative to the framework and is situated substantially directly below the stop.

4. The feeder as set out by claim 1 for feeding boards transverse to their lengths over a stop from the feed station at one elevation to the delivery station at a second elevation, wherein the drive means includes:
  a crank mounted to one end to the framework for rotation about a crank axis below the elevations of the feed station and delivery station and having remaining end mounted to the linkage means; and
  means operatively connected to the crank for selectively rotating the crank about the crank axis.

5. The feeder as set out by claim 4 wherein the first clamp means is connected by the linkage means to the framework for pivotal movement thereon about an axis that is situated below the elevations of the feed station and delivery station.

6. The feeder as defined by claim 1 wherein one of the clamp means includes a board engaging spring means for yieldably engaging and pressing a board against the opposed clamp means while moving with the clamp means from the feed station to the delivery station.

* * * * *